INVENTOR
Chalmers Morehead
BY
D. S. Buley
AGENT

United States Patent Office 3,422,299
Patented Jan. 14, 1969

3,422,299
FLUORESCENT LAMP HAVING AN INTEGRAL MERCURY-VAPOR PRESSURE CONTROL ASSEMBLY WITH AMALGAM-FORMING METAL AND AMALGAM STABILIZING MEANS
Chalmers Morehead, Upper Montclair, N.J., assignor to Westinghouse Electric Corporation, Pittsburgh, Pa., a corporation of Pennsylvania
Filed Feb. 3, 1966, Ser. No. 524,899
U.S. Cl. 313—174                           12 Claims
Int. Cl. H01j *19/68; 19/70; 61/24;* H01f *1/52*

ABSTRACT OF THE DISCLOSURE

The mercury-vapor pressure within a fluorescent lamp or similar electric discharge device is regulated by an amalgam-forming material that is retained at a selected location on and in direct contact with one of the mount assemblies by an overlying foraminous structure formed by a pair of mesh members arranged in laminated relationship. The inner mesh member is embedded in the amalgam-forming material and the size of the openings in the mesh members and the wettability characteristics of the material from which the mesh members are fabricated are selected and correlated to maintain the amalgam at the desired location on the mount when the amalgam is in a fluid state.

---

This invention relates to electric discharge devices and has particular reference to an improved assembly for controlling the mercury-vapor pressure within a fluorescent lamp by means of an amalgam-forming metal.

As is well known, the mercury-vapor pressure within a fluorescent lamp must be maintained within prescribed limits during operation in order to achieve optimum light output. The proper regulation of the mercury-vapor pressure becomes progressively more difficult as the operating temperature of the lamp increases and is thus a very critical design factor in so-called "highly-loaded" fluorescent lamps now being marketed, and in fluorescent lamps of conventional loading which are employed in enclosed fixtures.

The desired degree of control can be obtained by placing a predetermined amount of metal, such as indium, within the lamp at a location where it will combine with the mercury and form an amalgam which operates at a preselected temperature when the lamp is energized. Since the mercury-vapor pressure above such an amalgam is lower than that above liquid mercury at the same temperature, the amalgam is able to retain control of the mercury-vapor pressure over a much wider ambient-temperature range than the condensed pool of mercury employed in conventional fluorescent lamps.

It has been found that the amalgam-forming metal can be readily incorporated into the lamp structure by pressing it between two pieces of foraminous material, such as wire mesh, and then bending the resulting composite lamination into a collar which is slipped around one of the lamp stems. A control assembly and a fluorescent lamp utilizing this construction are disclosed and claimed in copending application Ser. No. 381,503 entitled "Mercury Vapor Discharge Lamp and Pressure Regulating Means Therefor," filed July 9, 1964 by George S. Evans and assigned to the assignee as the present application.

Experimental pilot runs of lamps provided with such laminated collar assemblies revealed that the amalgam-forming metal melted during the sealing-in operation and that occasionally some of the molten metal dropped off the collar while the lamp was being fabricated. This leakage problem was overcome by coating the ends of the collar with a substance which the metal or amalgam does not readily wet, or alternatively, by providing a margin or border around the periphery of the collar that is devoid of amalgam-forming metal. An improved vapor-pressure control assembly of this type is disclosed and claimed in application Ser. No. 524,907 of George S. Evans, which application is filed concurrently herewith and is assigned to the same assignee as the present application.

Life tests conducted on fluorescent lamps provided with the aforesaid "leak-proof" collar assemblies revealed another problem which developed as the lamps were burned. This problem came to light when it was noted that lamps fitted with mesh-collar assemblies impregnated with indium and burned in the usual horizontal position frequently developed mercury-vapor pressures that exceeded the optimum pressure. Further investigation indicated that this was caused by the movement of the amalgam from its initial uniform distribution within the cellular structure of the mesh collar assembly toward the top of the collar and the edge thereof closest to the cathode. For some unknown reason, the amalgam tends to move in the direction of higher temperatures and thus accumulates at the top of the collar as the lamp continues to burn and finally flows over the edge of the collar onto the glass stem tube. Once it wets the stem tube, it flows relatively rapidly over the glass surface toward the cathode, thus draining amalgam out of the collar assembly to the extent that in some cases the collar becomes substantially emptied of amalgam.

While the aforementioned amalgam migration does not cause the lamps to fail violently, the amalgam operates at progressively higher temperatures as it approaches the cathode. The amalgam thus gradually loses control of the mercury-vapor pressure and the lamp eventually functions as a conventional lamp in which a condensed pool of mercury serves as the control center. While the exact reason for this amalgam migration or transport phenomenon is known at the present time, it constitutes a serious obstacle as regards the marketing and commercial acceptance of fluorescent lamps utilizing amalgam-type vapor-pressure control means.

An improved pressure-regulating assembly which retards the migration of the amalgam by dividing the amalgam-forming metal into discrete segments within the assembly and by utilizing components that improve the thermal and amalgam-retention properties of the collar are disclosed and claimed in application Ser. No. 524,898 of George S. Evans entitled, "Mercury-Vapor Pressure Control Assembly With Segmented Amalgam-Forming Metal," which application is filed concurrently herewith and is assigned to the same assignee as the present invention. Prolonged life tests of lamps (over 5000 hours burning) provided with such improved assemblies have shown that the amalgam frequently still has a tendency to migrate to some extent, particularly in the case of indium-mercury amalgam containing in the order of 90 atomic percent indium.

It is, accordingly, the general object of the present invention to provide an electric discharge lamp that has an improved mercury-vapor pressure control assembly of the above-mentioned type which can be readily manufactured and will either eliminate, or reduce to tolerable limits, the migration of the amalgam throughout the useful life of the lamp.

Another object is the provision of a fluorescent lamp having a mount which includes a mercury-vapor pressure control assembly that contains an amalgam-forming metal and is so constructed that the amalgam will remain in place on the mount and retain control of the vapor pressure within the finished lamp until it reaches substantially the end of its rated life.

The foregoing objects, and other advantages which will become apparent as the description proceeds, are achieved in accordance with the present invention by fabricating the assembly from selected materials that exert a retaining force on the amalgam, and by placing the amalgam-forming metal at a predetermined location with respect to the assembly and the lamp mount to which it is attached. In general, the major portion of the amalgam-forming metal is located between the inner wire-mesh member of the laminated assembly and the stem tube in direct contact with the latter, and the inner and outer wire mesh components are fabricated from different size mesh and metals which are strongly and weakly wet, respectively, by the amalgam.

In a preferred embodiment, indium is used as the amalgam-forming metal and is pressed onto one side of a coarse nickel-wire metal, and a fine copper-wire mesh— the exposed surfaces of which are subsequently oxidized— is placed in overlapping relationship with the other side of the nickel wire mesh to form a lamination that is then bent into a collar. The resulting differential-wetting and mechanical restraining forces produced by this combination of elements, in conjunction with the segmentation of the indium and the indium-free borders etc. disclosed in the aforesaid concurrently-filed Evans applications, retains the amalgam within the assembly throughout the life of the lamp.

A better understanding of the invention will be obtained by referring to the accompanying drawings, wherein.

While the present invention can be utilized with advantage in various types of electric discharge devices which require means for controlling the vapor pressure of a selected metal or additive, it is especially adapted for use in conjunction with fluorescent lamps and has accordingly been so illustrated and will be so described.

EMBODIMENT I

Figure 1:
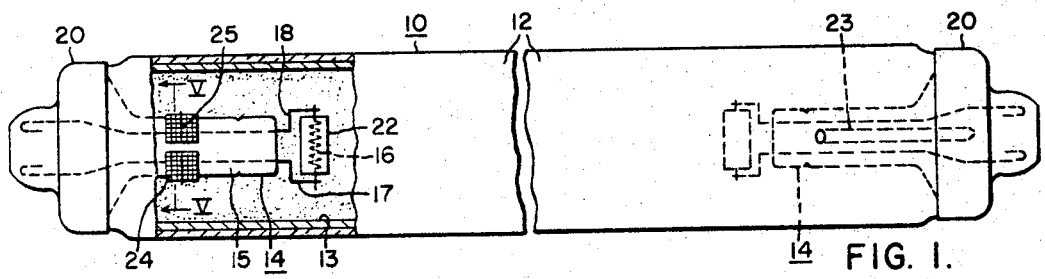
FIGURE 1 is an elevational fragmentary view of a fluorescent lamp incorporating the improved mercury-vapor pressure control assembly of the present invention, a portion of the lamp envelope being removed for purposes of illustration.

With specific reference now to the drawings, in FIG. 1 there is shown a fluorescent lamp 10 comprising a tubular vitreous envelope 12 having the customary mount 14 sealed into each of its ends. Each of the mounts include the usual vitreous stem tube 15 and a suitable cathode 16 that is attached to a pair of lead wires 17–18 sealed through the stem and connected to the terminals of a base member 20 attached to each end of the envelope 12. The cathode 16 consists of a tungsten wire coil that is coated with electron-emission material and disposed between a pair of enlarged anodes 22 attached to the lead wires. One of the mounts 14 is provided with a tabulation 23 which is tipped off after the lamp has been exhausted, dosed with mercury and filled with a suitable starting gas such as argon or neon, or a mixture thereof. The inner surface of the envelope 12 is coated with the customary coating 13 of ultraviolet-responsive phosphor.

Regulation of the mercury-vapor pressure within the lamp 10 during operation is achieved by means of a laminated assembly 24 that is formed into an annular ring or collar and secured in encircling relationship with the stem tube 15 at a predetermined distance from the cathode 16 by means of a resilient wire spring clip 25. The collar assembly 24 includes a predetermined quantity of a relatively soft metal, such as indium or the like, that has an affinity for mercury and combines with mercury molecules to form amalgam. The manner in which the amalgam-forming material coacts with the mercury to achieve the desired regulation of the mercury-vapor pressure over a wide range of ambient temperatures, and the relationship between the size of the lamp and quantity of such material required etc., are disclosed in detail in the aforementioned copending Evans application Ser. No. 381,503.

The present invention is directed to improvements in the construction of the laminated collar assembly and these will now be described.

Figure 2:
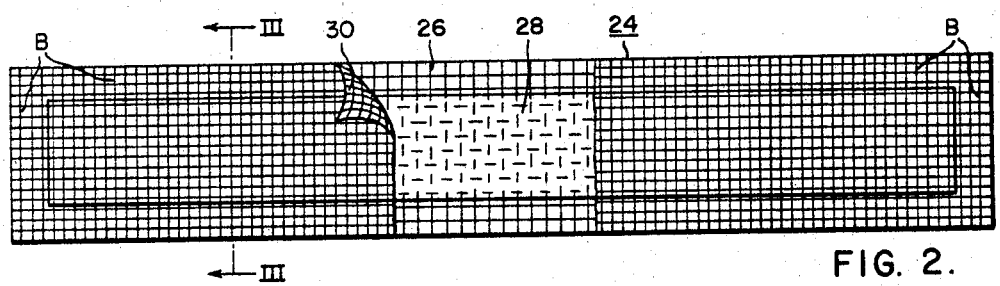
FIG. 2 is a plan view of one form of control assembly before it is bent into arcuate shape.
Figure 3:
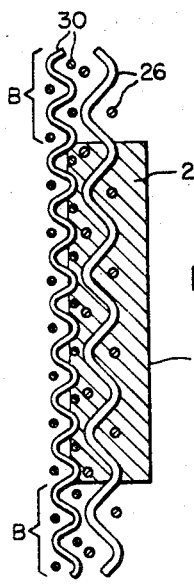
FIG. 3 is an enlarged cross-sectional view of the assembly along the line III—III of FIG. 2.
Figure 4:
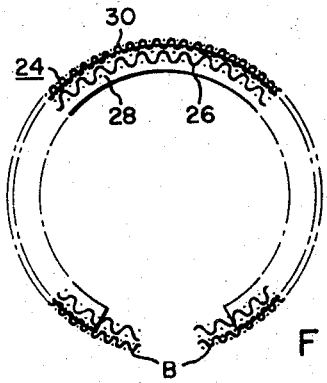
FIG. 4 is an end view of the assembly shown in FIGS. 2 and 3 after it has been bent into a collar and is ready to be mounted on the stem tube.
Figure 5:
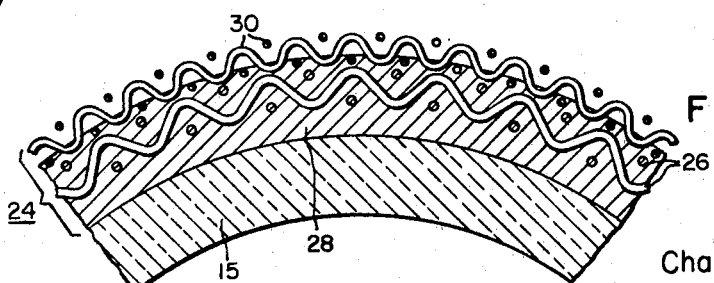
FIG. 5 is an enlarged cross-sectional view of a portion of the lamp stem and associated collar assembly, taken along the line V—V of FIG. 1.

According to the embodiment of the present invention illustrated in FIGS. 2 to 5, the collar 24 comprises an inner strip 26 of wire mesh that is embedded in a strip 28 of indium or other suitable amalgam-forming material. As is best shown in FIGS. 3 and 4, the wire mesh strip 26 is actually embedded in one side of the indium strip 28 so that the major portion of the indium is located on and protrudes from the opposite face of the wire mesh. A second strip 30 of wire mesh is pressed against the small quantity of indium that penetrates and extends through the openings in the wire mesh 26 and is thus partly embedded therein, as illustrated in FIGS. 3 and 5. This welds the wire-mesh strips together and provides a composite lamination 24 that can be handled and bent into arcuate shape without falling apart.

As will be noted in FIG. 2, the two wire-mesh strips 26 and 30 are of the same configuration and dimensions and are disposed so that their edges are aligned one with another. Also, the indium strip 28 is shorter and narrower and centrally located between the mesh strips so as to provide an indium-free border B that extends completely around the periphery of the assembly 24.

As will be noted in FIG. 4, when the assembly 24 is bent into the form of a collar, the protruding portion or side of the indium strip 28 constitutes the inner face of the collar, and the exposed portion of the wire mesh 30 the outer face of the collar. Thus, the major portion of the indium 28 is seated against the glass stem tube 15 when the collar 24 is placed on the mount 14, as is illustrated in FIG. 5. The indium is, accordingly located deep within the assembly 24 in direct contact with the stem 15.

The migration of the indium, and the subsequently formed indium-mercury amalgam, from the aforesaid location is prevented in accordance with one feature of this invention by making the outer wire strip 30 of finer mesh than the inner strip 26. This feature is clearly shown in FIGS. 3–5. Excellent results have been obtained in the case of a 1.5 ampere 96 inch T12 (1½″ diameter bulb) fluorescent lamp by making the outer component 30 from wire mesh having 80 meshes or openings per linear inch in each direction, and the inner component 26 from mesh having 50 openings per linear inch. The outer mesh is thus less porous than the inner mesh and serves to "lock-in" the fluid and amalgam.

Another important aspect of the invention is the concept of utilizing the principal of differential-wetting to retain the amalgam in place on the mount 14. This is achieved by fabricating the inner-mesh component 26 from a metal that is strongly wetted by indium and indium-mercury amalgam, and using an outer-mesh component 30 made of material that is poorly wetted by (or which tends to repel) the amalgam.

In the case of indium, satisfactory results have been obtained by using nickel (or nickel-plated) wire mesh as the inner component, and copper wire mesh as the outer component. It has been found that the heating of the mount during the sealing-in and other operations required to make the lamp automatically forms an oxide coating on the exposed outer surface and peripheral edges of the copper mesh. Tests have also shown that copper oxide is poorly wetted by the amalgam. Thus, the aforesaid copper-oxide coating serves as a barrier that prevents the amalgam from penetrating the copper mesh and migrating to the outer surface of the collar 24.

Stainless steel is also poorly wetted by indium and indium-mercury amalgam and thus can also be used in the outer mesh component. The combination of a stainless steel outer mesh and a nickel inner mesh provided effective retention in lamps having amalgams containing in the order of 80 atomic percent indium. This particular combination proved unsatisfactory for amalgams in the 90 atomic percent indium range.

Since the amalgam strongly wets glass, the desired retention of the amalgam deep within the assembly 24 next to the stem can also be achieved by making the inner-mesh component of stainless steel or similar material that will prevent the amalgam from penetrating the inner mesh and seeping out onto the outer mesh.

Preferably, the outer mesh in all cases is fabricated from copper or other good heat-conductive material that will uniformly distribute the heat around the collar.

As will also be noted in FIGS. 2 to 5, the inner-mesh component 26 is preferably made from heavier gauge wire than the outer component 30 to further improve the thermal characteristics of the assembly 24. In the case of a nickel inner and a copper outer, good results have been obtained by using copper wire 0.0055 of an inch in diameter and nickel wire having a diameter 0.009 of an inch.

EMBODIMENT II

Figure 6:
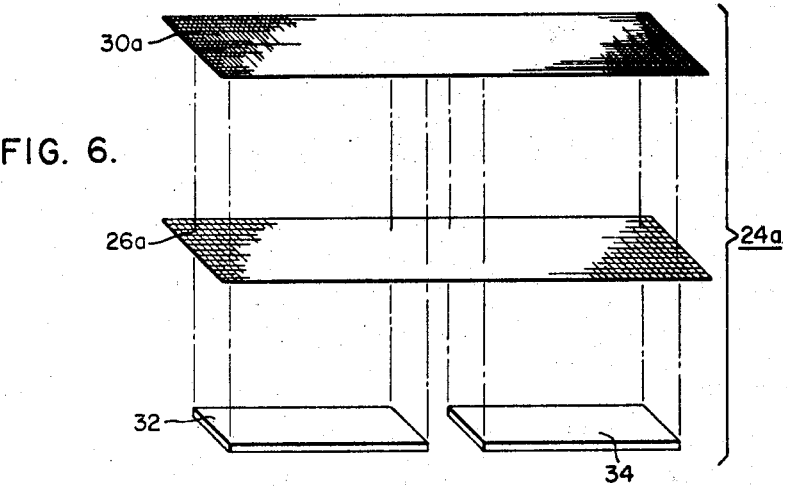
FIG. 6 is an exploded perspective view of the various components utilized in an alternative embodiment.
Figure 7:
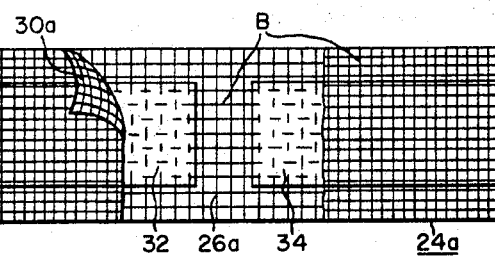
FIG. 7 is a plan view of the aforesaid components in assembled relationship.
Figure 8:
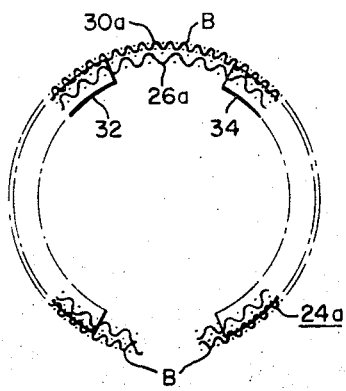
FIG. 8 is an end view of the collar formed from the foregoing assembly.

In FIGS. 6 to 8 there is shown another embodiment utilizing the "segmented" concept disclosed in the aforementioned concurrently-filed Evans application Ser. No. 524,898. As shown most clearly in FIG. 6, the assembly 24a comprises a pair of rectangular-shaped segments 32 and 34 of indium or the like that are arranged in spaced end-to-end relationship and aligned with medial portions of a coarse inner-mesh member 26a and a fine outer-mesh member 30a. The indium segments or strips 32 and 34 are pressed against the back or interior surface of the inner-mesh strip 26a with just enough force to cause some of the indium to penetrate the mesh and contact the proximate face of the outer-mesh strip 30a and thus bond or weld the members together.

The resulting lamination 24a is shown in FIG. 7. The indium strips 32 and 34 are spaced from each other in the lamination and are each surrounded by an indium-free border B that extends around the periphery and across the central portion of the assembly. This border, in conjunction with the placing of the indium strips 32 and 34 on the interiorly-disposed face of the collar 24a (shown in FIG. 8), serves to lock the indium deep within the inner confines of the assembly. When the indium melts during lamp manufacture, it flows and bridges the small air gap between the collar 24a and the stem tube 15. The amalgam is subsequently formed in the finished lamp within the collar in wetting contact with the stem in the same manner as in the previous embodiment.

Life tests have shown that lamps having vapor-pressure control assemblies utilizing the improvements of the present invention are not subject to amalgam migration during their useful life and continue to operate at a stabilized vapor pressure and output.

It will be appreciated from the foregoing that the objects of the invention have been achieved in that an improved mercury-vapor pressure control assembly has been provided which utilizes an amalgam-forming metal as the regulating medium and, by a unique combination of structural and functional features, locks the amalgam at a preselected location within the lamp throughout its useful life.

While several embodiments have been illustrated and described in accordance with the patent statutes, various modifications in the organization and composition of the different components can be made without departing from the spirit or scope of the invention.

I claim as my invention:

1. In an electric discharge lamp that contains a mount structure and an ionizable medium which includes mercury, a mercury-vapor pressure control assembly comprising, in combination:
 a body of relatively-soft metallic material that combines with mercury ot form an amalgam and is located on a surface of said mount structure, a first foraminous member embedded in said body of amalgam-forming material, and an overlying second foraminous member disposed in overlapping contiguous relationship with said embedded first foraminous member to retain in place the amalgam which is formed when said lamp is operated.

2. The lamp set forth in claim 1 wherein portions of said amalgam-forming material extend through openings in said first foraminous member and contact the proximate face of said second foraminous member at a sufficient number of locations to hold said members in integral laminated relationship.

3. The lamp set forth in claim 1 wherein said body of amalgam-forming material comprises a plurality of separate strips of such material that are spaced from the proximate edges of said first foraminous member and are thus each surrounded by portions of said first foraminous member that are devoid of amalgam-forming material.

4. The lamp set forth in claim 1 wherein said first foraminous member is totally embedded in the amalgam-forming material and the major portion of said material is disposed between said first foraminous member and said mount structure.

5. The lamp set forth in claim 1 wherein;
 said first foraminous member is composed of material that is readily wet by said amalgam-forming material, and
 said second foraminous member is composed of material that is less susceptible to wetting by said amalgam-forming material than said first foraminous member.

6. The lamp set forth in claim 1 wherein the relative size and number of the openings in said first and second foraminous members are such that the porosity of said first member is greater than that of the second member.

7. In a fluorescent lamp or the like having a vitreous envelope, the combination of:
 a vitreous stem that is sealed to an end of said envelope; and
 an arcuate mercury-vapor pressure control assembly that extends around a portion of and is located at a predetermined position on said stem,
 said arcuate assembly comprising the following components arranged in laminated relationship;
  (1) a pair of strips of relatively soft metal that has an affinity for and combines with mercury to form an amalgam, said strips being spaced one from another and comprising the inner face of said arcuate assembly that is seated against said stem,
  (2) a first elongated strip of wire mesh having (a) medial portions embedded in the outwardly-disposed surface of said amalgam-forming metal strips and (b) peripheral portions that extend beyond the side and end edges of said metal strips, and
  (3) a second elongated strip of wire mesh overlying said first wire-mesh strip and partly embedded in the proximate surface of said strips of amalgam-forming metal, said second wire-mesh strip comprising the exposed outwardly-disposed face of said assembly and having its peripheral edges in substantial alignment with those of said first wire-mesh strip.

8. The combination set forth in claim 7 wherein;
said first strip of wire mesh is fabricated from nickel, and
said second strip of wire mesh is fabricated from stainless steel.

9. The combination set forth in claim 7 wherein;
said first strip of wire mesh is fabricated from stainless steel, and
said second strip of wire mesh is fabricated from copper.

10. The combination set forth in claim 7 wherein;
said first strip of wire mesh is fabricated from nickel, and
said second strip of wire mesh is fabricated from copper.

11. The combination set forth in claim 10 wherein the exposed surfaces of said copper wire mesh are coated with a layer of copper oxide.

12. The combination set forth in claim 10 wherein;
said nickel wire mesh has approximately 50 openings per linear inch, and
said copper wire mesh has approximately 80 openings per linear inch.

References Cited

UNITED STATES PATENTS

| | | | |
|---|---|---|---|
| 2,077,961 | 4/1937 | Smith | 313—179 |
| 2,404,803 | 7/1946 | Stafford | 206—4 |
| 3,007,071 | 10/1961 | Lompe et al. | 313—109 |
| 3,152,278 | 10/1964 | Dziergwa et al. | 313—109 |
| 3,187,885 | 6/1965 | Hansen et al. | 260—4 |

JAMES W. LAWRENCE, *Primary Examiner.*

R. F. HOSSFELD, *Assistant Examiner.*

U.S. Cl. X.R.

313—180